US012776442B2

(12) United States Patent
Thompson et al.

(10) Patent No.: US 12,776,442 B2
(45) Date of Patent: Oct. 27, 2026

(54) TRANSFORMER AND DEVICE CONFIGURED TO PROVIDE A CURRENT LIMITING POWER SOURCE AND A GALVANIC BARRIER

(71) Applicant: SCOTT TECHNOLOGIES, INC., Monroe, NC (US)

(72) Inventors: Darin K. Thompson, Huntersville, NC (US); Matthew M. Shettel, Monroe, NC (US); David Allen Amero, Airdrie (CA); Ivan Mateo Delamer, Calgary (CA); Andrea Dukeshire, Calgary (CA)

(73) Assignee: SCOTT TECHNOLOGIES, INC., Monroe, NC (US)

(*) Notice: Subject to any disclaimer, the term of this patent is extended or adjusted under 35 U.S.C. 154(b) by 1194 days.

(21) Appl. No.: 17/640,877

(22) PCT Filed: Sep. 4, 2020

(86) PCT No.: PCT/IB2020/058269
§ 371 (c)(1),
(2) Date: Mar. 7, 2022

(87) PCT Pub. No.: WO2021/048721
PCT Pub. Date: Mar. 18, 2021

(65) Prior Publication Data

US 2022/0336148 A1 Oct. 20, 2022

Related U.S. Application Data

(60) Provisional application No. 62/898,881, filed on Sep. 11, 2019.

(51) Int. Cl.
*H01F 38/02* (2006.01)
*A62B 7/02* (2006.01)
(Continued)

(52) U.S. Cl.
CPC ............... *H01F 38/02* (2013.01); *A62B 7/02* (2013.01); *A62B 9/00* (2013.01); *A62B 9/006* (2013.01); *H01F 29/14* (2013.01); *H02H 9/008* (2013.01)

(58) Field of Classification Search
CPC .. A62B 9/006; A62B 7/02; A62B 7/10; A62B 7/14; A62B 18/006; A62B 18/02;
(Continued)

(56) References Cited

U.S. PATENT DOCUMENTS 4,031,457 A 6/1977 Oberbeck
4,130,790 A * 12/1978 Heisey ...................... G05F 1/32 363/75
(Continued)

FOREIGN PATENT DOCUMENTS

CN 102479603 5/2012
CN 107910164 A 4/2013
(Continued)

OTHER PUBLICATIONS

English Machine Translation of CN-105740183-A provided by PE2E (Year: 2016).*
(Continued)

*Primary Examiner* — Joseph D. Boecker
*Assistant Examiner* — Brian T Khong
(74) *Attorney, Agent, or Firm* — Weisberg I.P. Law, P.A.

(57) ABSTRACT

According to one or more embodiments, a current limiting device is provided. The current limiting device includes a transformer including: a primary winding configured to accept an input current, a core electromagnetically coupled to the primary winding, and a secondary winding electromagnetically coupled to the core. The secondary winding is configured to provide a current limiting energy source based on the input current where the current limiting energy source
(Continued)

is limited to a predetermined maximum current based on at least one characteristic of the core.

8 Claims, 9 Drawing Sheets

(51) Int. Cl.

| | |
|---|---|
| ***A62B 9/00*** | (2006.01) |
| ***H01F 29/14*** | (2006.01) |
| ***H02H 9/00*** | (2006.01) |

(58) Field of Classification Search
CPC ....... A62B 18/04; A62B 18/045; A62B 18/08; H02H 9/008; H02H 9/02; H02H 9/021; G05F 1/32; G05F 1/325
See application file for complete search history.

(56) References Cited

U.S. PATENT DOCUMENTS 4,328,538 A * 5/1982 Pollmeier ................ H02H 9/02 363/56.1
5,495,149 A * 2/1996 Hiramatsu ........... H05B 41/282 315/219
5,515,262 A 5/1996 Johnston et al.
2005/0217275 A1* 10/2005 Hendrickson ............. F02C 1/02 128/200.24
2007/0079701 A1* 4/2007 Sayers ................. A62B 18/006 95/1
2014/0082829 A1* 3/2014 Volmer .................. A62B 18/00 2/410
2015/0162742 A1 6/2015 Tekletsadik
2015/0211534 A1* 7/2015 Volmer ................ A62B 18/006 417/45
2017/0047732 A1 2/2017 Landwer et al.
2017/0265259 A1 9/2017 Janik et al.
2019/0242928 A1* 8/2019 Williams ............... H02H 9/008
2021/0033100 A1* 2/2021 Volmer ..................... H02J 7/62

FOREIGN PATENT DOCUMENTS

CN 105740183 A * 7/2016 ............. H02H 9/047
CN 103077806 A 11/2016
EP 2612688 A1 3/2018
JP 2014143876 8/2014
WO 2012092698 A1 7/2012

OTHER PUBLICATIONS

International Search Report for PCT International Application No. PCT/IB2020/058269, mailed on Dec. 9, 2020, 3 pages.
Tang, “Vision C5 Chinboard PCB”, Scott Safety, 2019, pp. 1-5.

* cited by examiner

TRANSFORMER AND DEVICE CONFIGURED TO PROVIDE A CURRENT LIMITING POWER SOURCE AND A GALVANIC BARRIER

FIELD

The present disclosure is generally related to a current limiting device and system, and in particular to a transformer and devices that use the transformer where the transformer is configured to provide a current limiting energy source and/or a galvanic barrier.

BACKGROUND

For a system having one or more circuits operating according to at least one system voltage, electrical design principles may suggest reducing impedance to minimize voltage drops and maximize the use of available current. Conversely, intrinsically safe (IS) designs may suggest increasing impedance to limit potentially arcing currents and minimize power delivered to circuit components. IS refers to general guidelines/principles that are typically used for manufacturing equipment for use in hazardous environments. One aim of IS equipment is to limit the energy available in the equipment for ignition of flammable fluids in the hazardous environment. For example, electrical components in Self-Contained Breathing Apparatuses (SCBAs) may follow general IS guidelines in order to limit and/or eliminate the chances of one or more electrical components producing a spark sufficient to ignite flammable fluids such as flammable gases. In other words, from an IS perspective, the amount of stored energy in a product may need to be limited based on the target gas group of a hazardous environment. The stored energy limits may relate to how much capacitance and inductance are in the products/equipment as well as how much electrical current is available.

One existing method for helping meet IS guidelines for limiting current and/or energy to predefined safe levels is to add resistance to the power supply such as via one or more current limiting resistor(s) (CLRs). However, the CLR creates functional challenges due to the resulting resistive voltage drop. In particular, a CLR is a linear device where the resistive voltage drop negatively affects system performance across the entire range of operating currents including intrinsically safe regions, as shown in the hatched portions of FIG. 1. For battery operated circuits of the SCBA mask that use CLRs, the voltage drops across CLRs may need to be factored into battery life calculations to help prevent brown out of critical circuitry during maximum current demands. That is, CLRs limit usable battery capacity where the battery life of a product/equipment using CLR(s) is shown in FIG. 2, where Vmin may equate to the minimum voltage required to help avoid brown out (i.e., power off) of circuitry and Vbat is the output battery voltage over time where Vbat would likely be higher if not for the voltage drop caused by the CLRs. Therefore, existing current limiting methods negatively impact performance of IS based products and/or equipment.

SUMMARY

The techniques of this disclosure generally relate to a current limiting device, and in particular to a transformer configured to provide a current limiting energy source for use in an IS environment. In one or more embodiments, the current limiting device further provides a galvanic barrier configured to isolate circuits and/or portions of an electrical circuit. In some embodiments, the transformer is part of a power circuit system in an SCBA mask or other product for use in hazardous environments.

According to one embodiment of the invention, a current limiting device is provided. The current limiting device includes a transformer including: a primary winding configured to accept an input current, a core electromagnetically coupled to the primary winding, and a secondary winding electromagnetically coupled to the core. The secondary winding configured to provide a current limiting energy source based on the input current where the current limiting energy source is limited to a predetermined maximum current based on at least one characteristic of the core.

According to one or more embodiments of this aspect, the at least one characteristic of the core is at least one core saturation characteristic. According to one or more embodiments of this aspect, the at least one core saturation characteristic of the core includes at least one dimension and at least one material of the core. According to one or more embodiments of this aspect, the current limiting energy source is configured to provide energy to at least two peripheral devices having different power consumption requirements.

According to one or more embodiments of this aspect, the current limiting energy source is configured to provide galvanic isolation and power for a serial port for powering at least one serial port peripheral device. According to one or more embodiments of this aspect, the transformer is a push-pull transformer. According to one or more embodiments of this aspect, the current limiting device is configured to be part of a self-contained breathing apparatus (SCBA) mask. According to one or more embodiments of this aspect, the current limiting device is a resistor-less current limit device. According to one or more embodiments of this aspect, the current limiting device further includes at least one safety circuit in electrical communication with the secondary winding where the at least one safety circuit at least one Zener diode that is configured to shut to ground based at least in part on a voltage at the secondary winding.

According to another aspect of the invention, a mask configured for fluid communication with a fluid reservoir is provided. The mask includes a fluid regulator in fluid communication with the fluid reservoir where the fluid regulator is configured to regulate fluid flow. The mask includes an energy source, and a current limiting device including a transformer. The transformer includes a primary winding configured to accept an input current, a core electromagnetically coupled to the primary winding, and a secondary winding electromagnetically coupled to the core where the secondary winding is configured to provide a current limiting energy source based on the input current. The current limiting energy source is limited to a predetermined maximum current based on at least one characteristic of the core.

According to one or more embodiments of this aspect, the at least one characteristic of the core is at least one core saturation characteristic. According to one or more embodiments of this aspect, the at least one core saturation characteristic of the core includes at least one dimension and at least one material of the core. According to one or more embodiments of this aspect, the current limiting energy source is configured to provide energy to at least two peripheral devices having different power consumption requirements.

According to one or more embodiments of this aspect, the current limiting energy source is configured to provide galvanic isolation and power for a serial port for powering at least one serial port peripheral device. According to one or more embodiments of this aspect, the transformer is a push-pull transformer. According to one or more embodiments of this aspect, the current limiting device is a resistor-less current limit device. According to one or more embodiments of this aspect, the limiting device further includes at least one safety circuit in electrical communication with the secondary winding, the at least one safety circuit including at least one safety shunt assembly having at least one silicone controlled rectifier (SCR) configured as a safety shunt assembly that shunts to ground based at least in part on a voltage at the secondary winding. According to one or more embodiments of this aspect, the limiting device further includes at least one safety circuit in electrical communication with the secondary winding where the at least one safety circuit includes at least one Zener diode that is configured to shunt to ground based at least in part on a voltage at the secondary winding.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
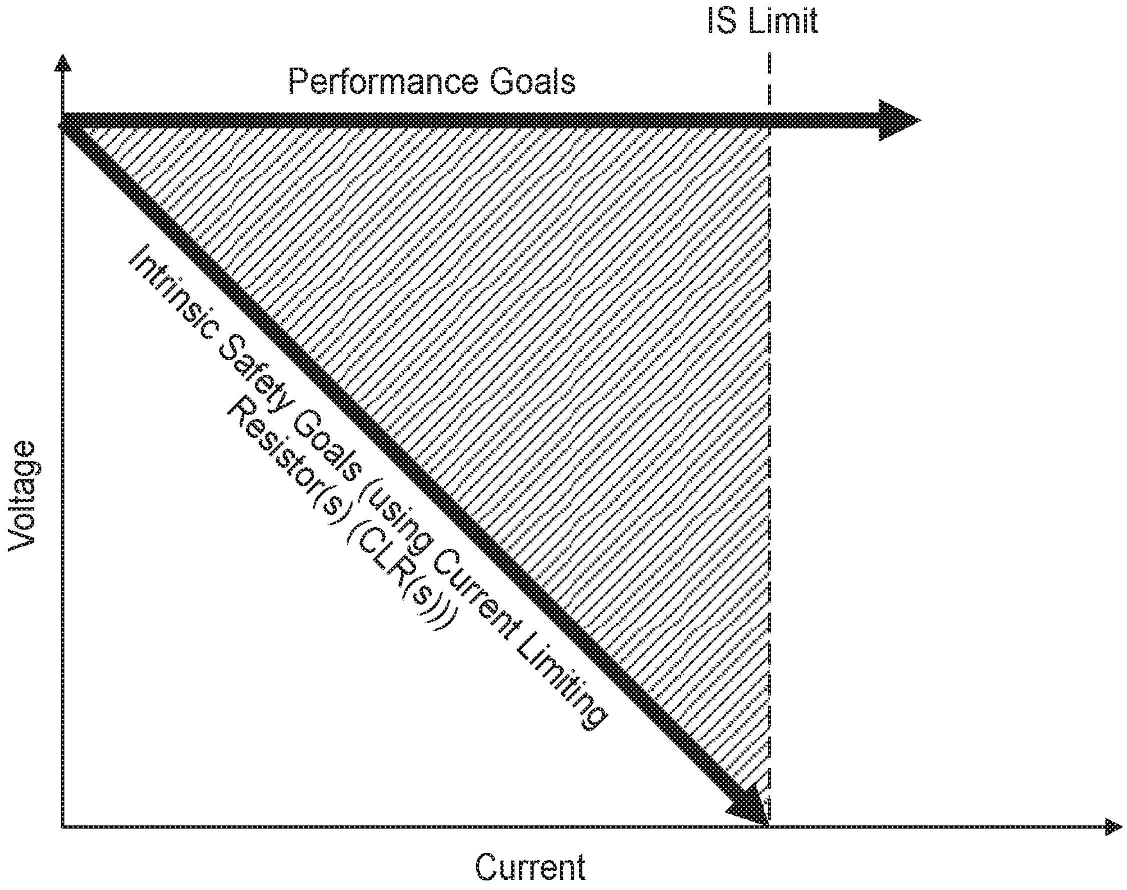
FIG. 1 is a diagram of voltage versus current of an existing current limiting resistor.
Figure 2:
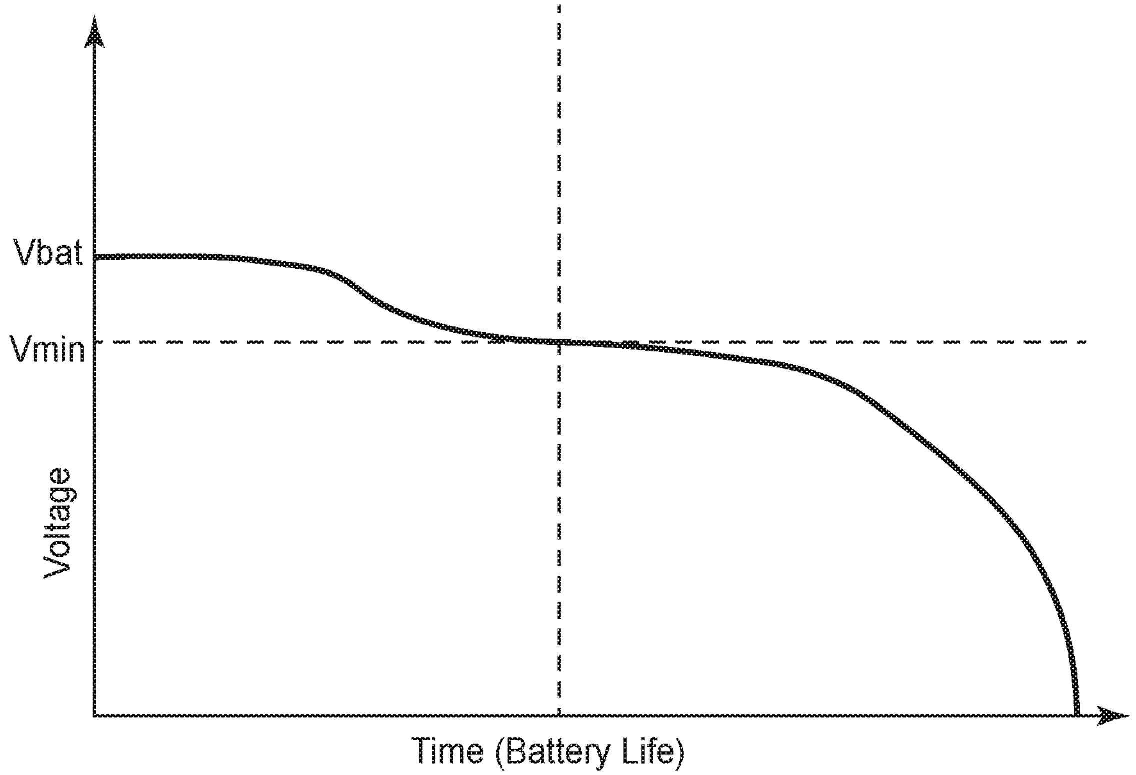
FIG. 2 is a diagram of voltage versus time for an existing current limiting resistor configuration.

Before describing in detail exemplary embodiments, it is noted that the embodiments reside primarily in combinations of apparatus components and processing steps related to a current limiting device, and in particular to a transformer configured to provide a current limiting energy source.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections for communicating signals.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
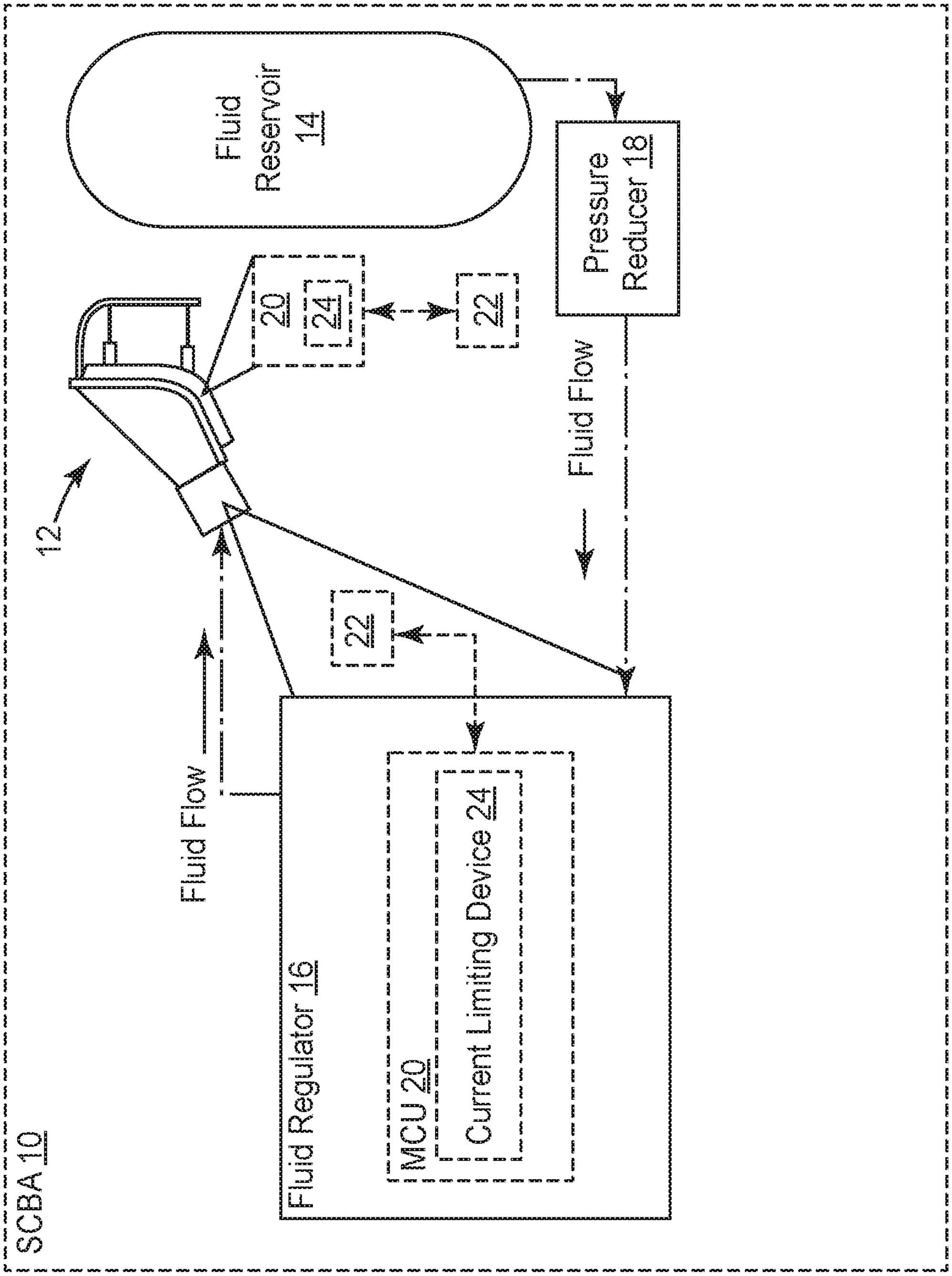
FIG. 3 is a block diagram of a SCBA according to one or more embodiments of the invention.

FIG. 3 is a block diagram of an example of a Self-Contained Breathing Apparatus (SCBA) 10. SCBA 10 includes mask 12 for covering at least a portion of a first responder's face and for providing fluid, e.g., breathable air, from fluid reservoir 14 to the first responder as is known in the art. In one or more embodiments, mask 12 is in fluid communication with fluid reservoir 14 via fluid regulator 16 and pressure reducer 18. Fluid reservoir 14 is configured to store fluid and provide fluid to the user/first responder using SCBA 10.

Fluid regulator 16 is configured to regulate fluid flow to mask 12 and may be removably affixed to mask 12. In one or more embodiments, SCBA 10 and/or fluid regulator 16 includes a microcontroller unit (MCU) 20 that is configured to provide one or more functions for SCBA 10 such as one or more of transmitting/receiving audio, displaying information on a display associated with mask 12, communicating with and/or controlling one or more devices 22 such as peripheral devices 22, providing power to one or more devices/peripheral devices 22, among other functions. While MCU 20 is illustrated as being part of fluid regulator 16, MCU 20 may be part of and/or removably attached to another component of SCBA 10 in accordance with the principles of the inventions. In one or more embodiments, MCU 20 includes a current limiting device 24 for providing a current limiting energy source for devices 22, as described herein such as with respect to FIGS. 5 and 6. For example, in one or more embodiments, the current limiting energy source provided by current limiting device 24 is configured to provide energy to at least two devices 22, i.e., peripheral devices, that may have different power consumption requirements. MCU 20 is described in further detail with respect to FIG. 4. While the current limiting device 24 is described as being part of SCBA 10, current limiting device 24 is equally applicable to equipment and/or circuits other than those associated with SCBA 10 such that current limiting device 24 is configured to provide an energy source to a predetermined maximum current for other technologies for use in, for example, IS environments.

One or more of devices 22 may be removably connectable with MCU 20 where each device 22 may be configured to provide one or more respective functions, thereby adding to the functionality of MCU 20 and mask 12 if one or more devices 22 are removably connected to/with MCU 20. Device 22 may include one or more of a bone transducer control device, sight device (e.g., camera device), microphone/talking device, among other devices.

Figure 4:
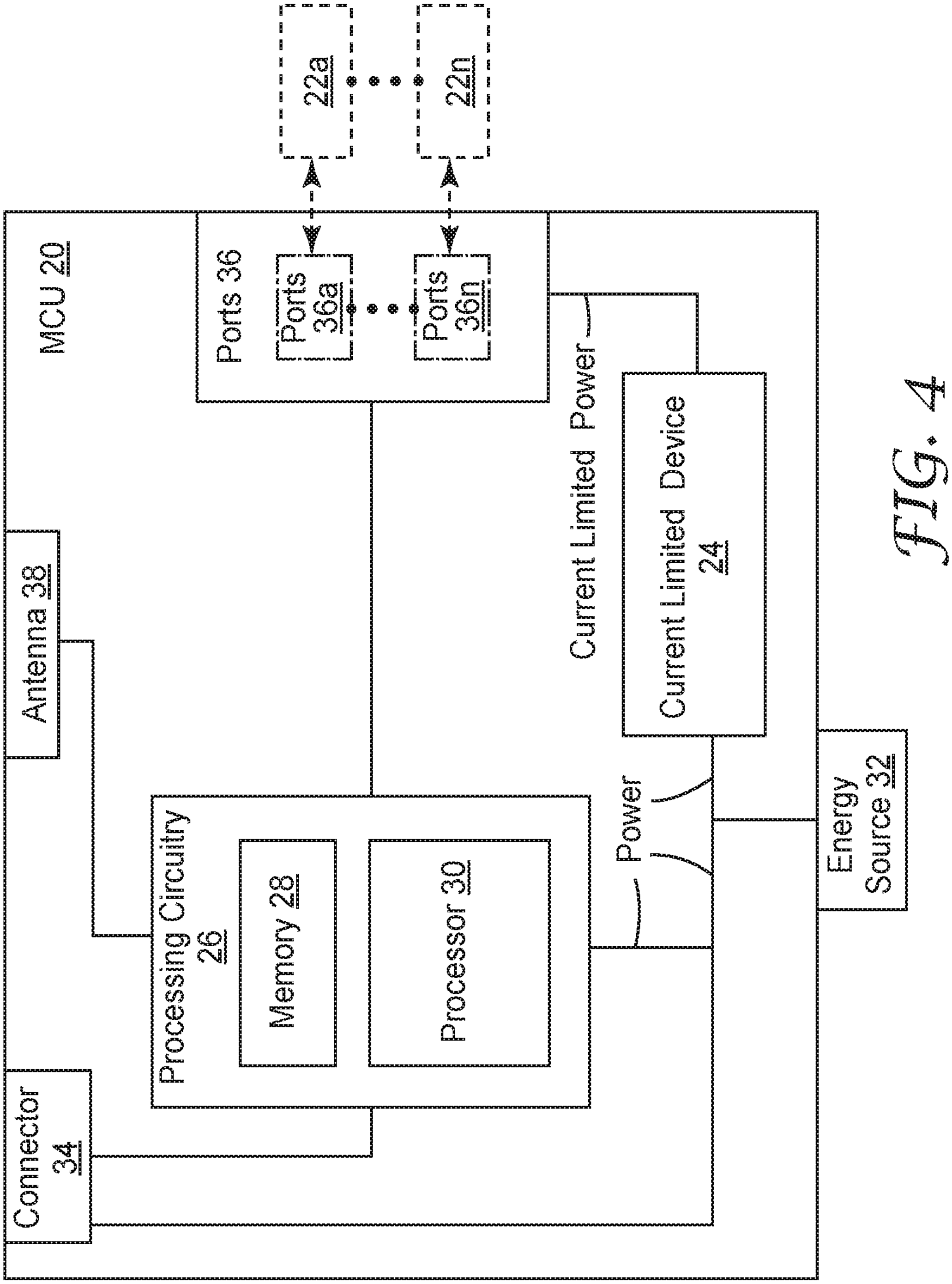
FIG. 4 is a block diagram of a micro controller unit according to one or more embodiments of the disclosure.

FIG. 4 is a block diagram of MCU 20 in accordance with one or more embodiments of the disclosure. MCU 20 includes processing circuitry 26. The processing circuitry 26 may include processor 30 and a memory 28. In particular, in addition to or instead of a processor 30, such as a central processing unit, and memory 28, the processing circuitry 26 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 30 may be configured to access (e.g., write to and/or read from) the memory 28, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the MCU 20 further has software stored internally in, for example, memory 28, or stored in external memory (e.g., database, storage array, network storage device, etc.) accessible by the MCU 20 via an external connection. The software may be executable by the processing circuitry 26. The processing circuitry 26 may be configured to control any of the methods and/or processes of SCBA 10 and/or to cause such methods, and/or processes to be performed, e.g., by MCU 20. Processor 30 corresponds to one or more processors 30 for performing SCBA 10 functions as is generally known in the art. The memory 28 is configured to store data, programmatic software code and/or other information. In some embodiments, the software stored in memory 28 may include instructions that, when executed by the processor 30 and/or processing circuitry 26, causes the processor 30 and/or processing circuitry 26 to perform one or more known processes with respect to MCU 20 and/or SCBA 10.

MCU 20 is in electrical communication with one or more energy sources 32 (collectively referred to as energy source 32). Energy source 32 is configured to provide energy to one or more components: of MCU 20, connected to MCU 20 and/or of SCBA 10, among other devices/components in electrical communication with energy source 32. In one or more embodiments, energy source 32 is one or more batteries of one or more battery types that are known in the art.

In one or more embodiments, energy source 32 is in electrical communication with one or more components of MCU 20 such as one or more of processing circuitry 26, current limiting device 24, connector 34, among other components that are part of MCU 20 and/or in electrical communication with MCU 20. MCU 20 includes one or more connectors 34 that are configured to one or more of transmit, receive, provide one or more of data, power, communication, etc. to another component removably connected to connector 34. MCU 20 includes one or more ports 36 (collectively referred to as port 36) that may be in electrical communication with one or more components of MCU 20 such as one or more of processing circuitry 26, current limiting device 24, connector 34, etc. In one or more embodiments, port 36 is a one or more of a serial port, universal serial bus (USB) port, RS-485 based port, among other types of ports according to one or more communication configurations and/or standards. Current limiting device 24 allows for port 36 to work with a wide array of devices 22 as product requirements develop and technology advances. MCU 20 may communicate with and/or control one or more devices 22.

In one or more embodiments, one or more devices 22 are configured to be removably insertable with one or more ports 36 such as to provide electrical communication between port 36 and device 22. In one or more embodiments, current limiting device 24 is in electrical communication with port 36 where current limiting device 24 provides energy to port 36, i.e., current limiting device 24 may act as a current limiting energy source to port 36. In one or more embodiments, the current limiting energy source is configured to provide galvanic isolation and energy for one or more ports 36 such as serial ports for powering at least one serial port peripheral device 22. In one or more embodiments, current limiting device 24 is configured to accept input current such as from energy source 32 and provide a current limiting energy source based on the input current as described herein. Current limiting device 24 is described in detail with respect to FIGS. 5 and 6.

MCU 20 may include one or more antennas 38 for providing wireless communication with one or more components of SCBA 10 and/or other SCBAs 10, among other devices that may be configured to communicate with SCBA 10 via wireless communications. In one or more embodiments, antenna 38 is a Near Field Communication (NFC) antenna configured to transmit and/or receive wireless communications according to NFC standards that are known in the art.

Figure 5:
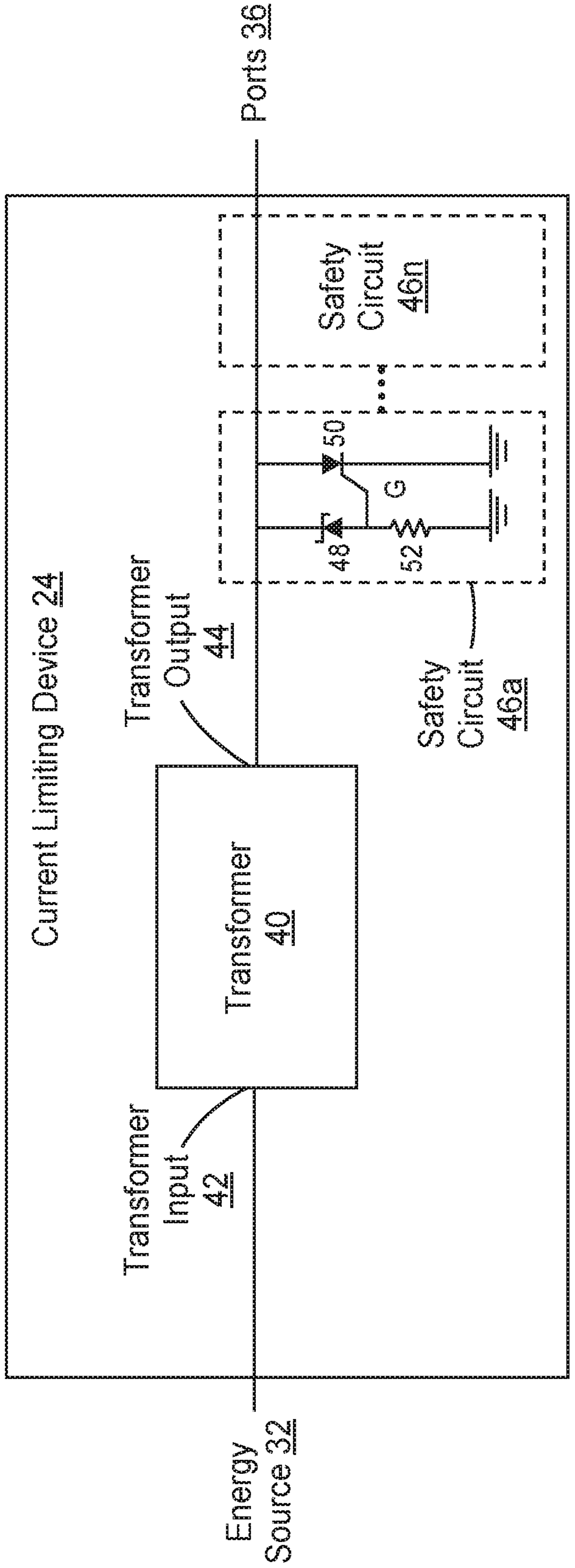
FIG. 5 is a block diagram of a current limiting device according to one or more embodiments of the disclosure.

FIG. 5 is a block diagram of current limiting device 24 according to one or more embodiments of the invention. Current limiting device 24 includes transformer 40 that is configured with one or more transformer inputs 42 and one or more transformer outputs 44. Transformer 40 is specifically configured to provide a current limited energy source at transformer output 44. For example, transformer 40 is specifically configured to be a current limiting energy source by using one or more characteristics of the core of the transformer 40, such as one or more core saturation characteristics, to provide a maximum current output, i.e., predefined/predetermined maximum current output. In other words, the transformer 40 has a core that is specifically configured to saturate at a predefined level such as to provide a predefined maximum current output, similar to CLRs, but without the adverse voltage drop of CLRs.

In general, core saturation may refer to a limit on magnetic flux limitations of the core of the transformer as ferromagnetic materials cannot support infinite magnetic flux densities. The magnetic flux limitations of the core may be based at least in part on the material of the core and the size of the core, among other core saturation characteristics. During core saturation, an increase in the magnetic field force does not result in a proportional increase in magnetic field flux such as to limit the current output to a predefined maximum current output. Further, core saturation may be affected by one or more of resistance(s) in one or more coils of the transformer, leakage current and a foil screen described herein that may reduce or increase the predefined/predetermined maximum current output. Therefore, a transformer 40 operating in the core saturation region may be limited to outputting a predefined/predetermined maximum current output, as described herein.

In one or more embodiments, the predefined maximum current output of transformer 40 is configured to meet one or more IS guidelines. For example, in one or more embodiments, the predefined maximum current output of the transformer 40 is limited to the spark ignition limit of a targeted gas group. For example, in one or more embodiments, the predefined (i.e., preconfigured) maximum current output of the transformer 40 is limited to no greater than one of: 3.5 amps, about 3.5 amps, 4.0 amps, about 4.0 amps, 4.5 amps and about 4.5 amps.

In one or more embodiments, current limiting device 24 may include one or more safety circuits 46*a*-46*n* (collectively referred to as safety circuit 46) that are configured to shunt to ground based at least in part on a voltage output from transformer output 44. For example, in one or more embodiments, current limiting device 24 includes at least one safety circuit 46 in electrical communication with the secondary winding of transformer 40. The at least one safety circuit 46 may include at least one Zener diode 48 that is configured to shunt to ground based at least in part on a voltage at the secondary winding of the transformer 40. In one or more embodiments, at least one safety circuit 46 may include at least one safety shunt assembly that includes at least one silicone controller rectifier (SCR) configured as a safety shunt assembly that shunts to ground based at least in part on a voltage at the secondary winding. For example, in one or more embodiments, the safety circuit 46 may include at least one SCR to shunt to ground due to a transformer output voltage of a predefined value such as 6 volts.

In one example, safety circuit 46 may shunt to ground due to a transformer output voltage of 6 volts. In one or more embodiments, safety circuit 46 includes at least one Zener diode 48, at least one diode 50 and at least one resistor 52. An example configuration of safety circuit 46 is illustrated in FIG. 5. For example, an anode of the Zener diode 48 is in electrical series communication with resistor 52 that is configured to be in electrical communication with a printed circuit board (PCB) ground. The cathode of the Zener diode 48 is in electrical communication with transformer output 44. In one or more embodiments, a cathode of diode 50 is in electrical communication with a printed circuit board (PCB) ground while the anode of diode 50 is in electrical communication with transformer output 44 and with the cathode of Zener diode 48. A gate of diode 50 may be configured to be in electrical communication with resistor 52 and the anode of Zener diode 48. While FIG. 5 illustrates one example of safety circuit 46, other configurations of safety circuit 46 with at least one different electrical element may be incorporated according to the principles of the disclosure where safety circuit 46 is still configured to shunt to ground.

Figure 6:
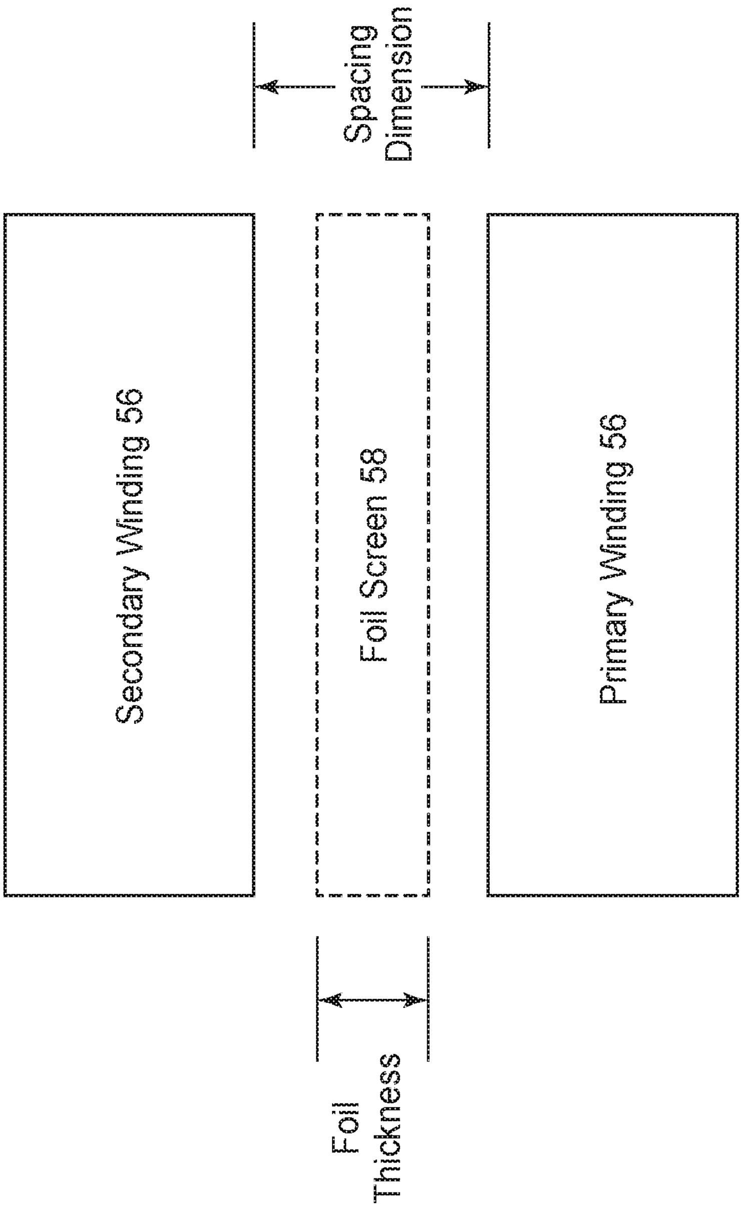
FIG. 6 is a diagram of a portion of a transform according to one or more embodiments of the disclosure.

FIG. 6 is a diagram of a portion of transformer 40 according to one or more embodiments of the invention. In one or more embodiments, the at least one core saturation characteristic of the core includes one or more of at least one dimension and at least one material of the core. In a specific aspect, the at least one dimension is a spacing dimension between the primary winding 54 and the secondary winding 56 as illustrated in FIG. 6. In one or more embodiments, the spacing dimension is configured to allow for a foil screen 58 to be provided between the primary winding 54 and the secondary winding 56. The foil screen 58 is configured to affect a rate of current change over time change (i.e., $\Delta I/\Delta T$) and/or limit magnetic flux into core 53 of transformer, which affects the core saturation, i.e., affects the limit on magnetic flux limitations of the core 53 of the transformer 40. In one or more embodiments, the foil screen 58 is formed of copper. In one or more embodiments, the foil screen 58 has a foil thickness of at least 0.075 mm. In one or more embodiments, the at least one material of the core 53 includes one or more ferromagnetic metals such as one or more of iron and steel. In one or more embodiments, the current limiting device 24 is a resistor-less current limiting device as described herein. In one or more embodiments, transformer 40 is a Type 2B push-pull transformer that is configured, as described herein, to provide a current limiting transformer or resistor-less current limiting device that may operate within one or more predefined IS limits.

Figure 7:
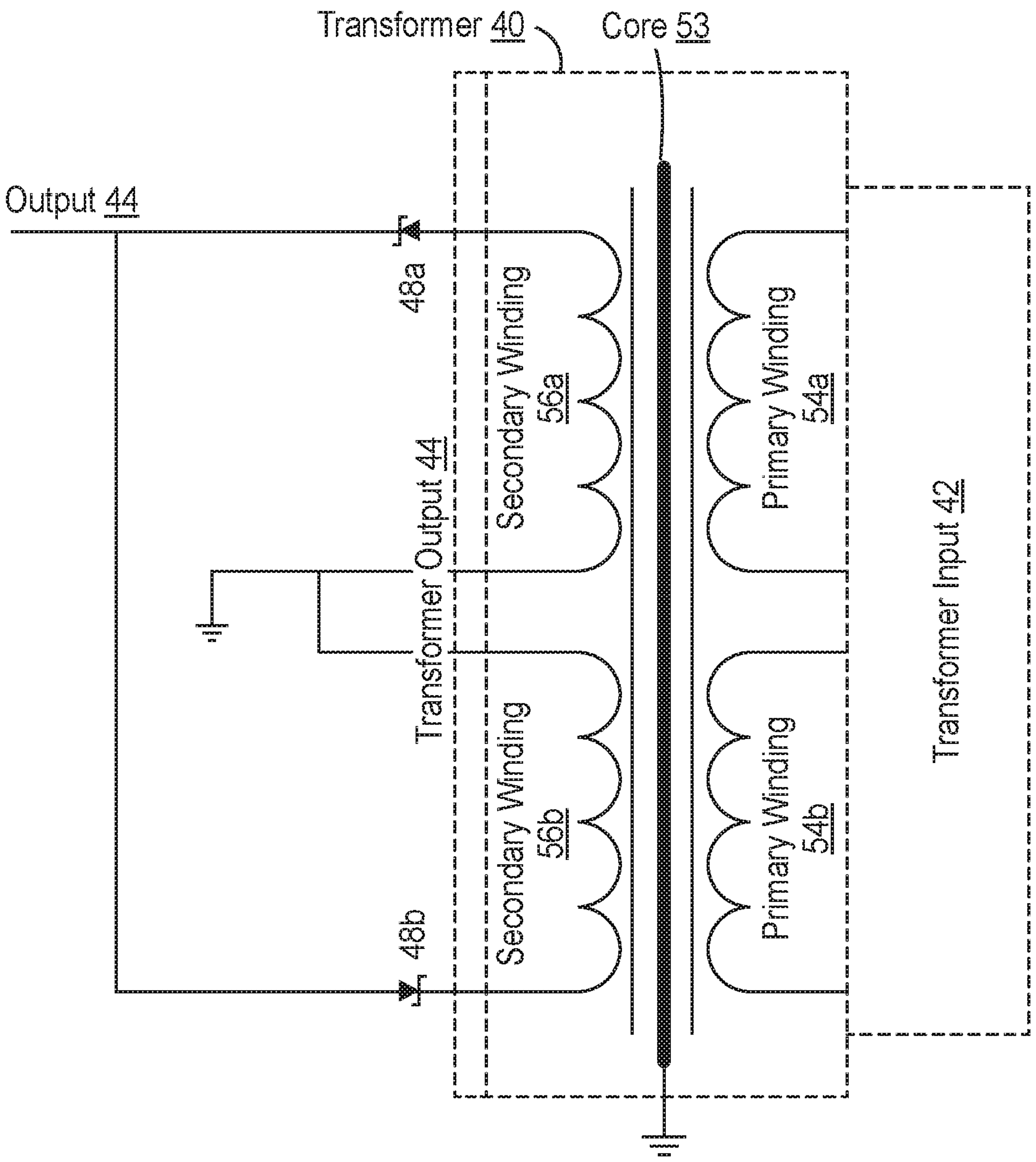
FIG. 7 is a diagram of a transformer configured to provide a current limiting energy source according to one or more embodiments of the disclosure.

FIG. 7 illustrates an example transformer 40 configuration of current limiting device 24 in accordance with one or more embodiments of the disclosure. For example, in one or more embodiments, transformer 40 is a multiple winding transformer 40 that includes core 53, primary windings 54*a* and 54*b* and secondary windings 56*a* and 56*b* where primary windings 54*a* and 54*b* are configured to receive a current from energy source 32 such as via one or more circuits (not shown) as a transformer driver circuit that is known in the art. Secondary windings 56*a* and 56*b* are configured such that the negative polarity of secondary winding 56*a* is connected to the positive polarity of secondary winding 56*b*. The positive polarity of secondary winding 56*a* is connected to an anode of Zener diode 48*a* for providing transformer output 44. The negative polarity of secondary winding 56*b* is connected to a cathode of Zener diode 48 for providing transformer output 44. The positive polarity of secondary winding 56*b* and the negative polarity of secondary winding 56*a* are connected to PCB ground. While FIG. 7 illustrates a specific configuration for transformer 40, other configurations are contemplated in accordance with one or more embodiments of the disclosure. For example, while transformer 40 is illustrated in FIG. 7 as including two primary windings 54*a* and 54*b* and two secondary windings 56*a* and 56*b*, other winding configurations are possible in accordance with the principles of the invention.

Figure 8:
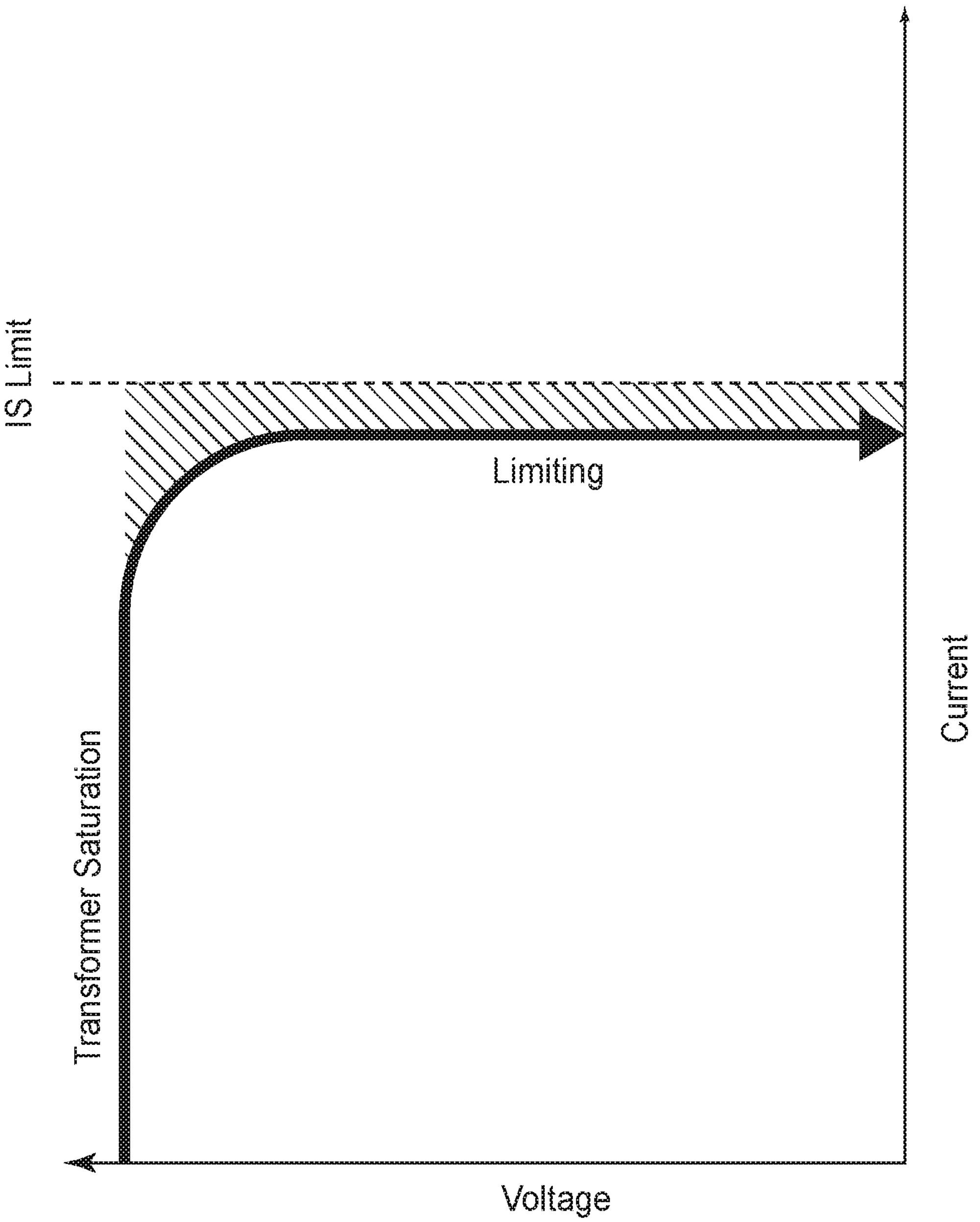
FIG. 8 is a diagram of voltage versus current of the transformer configuration according to one or more embodiments of the disclosure.

FIG. 8 is a diagram of voltage versus current for one or more embodiments of transformer 40. In particular, transformer 40 saturation is non-linear such as to provide passive IS current/energy limitations while providing improved battery life over the CLRs configurations as shown by the reduced area shaded with a hatching when compared to FIG. 1.

Figure 9:
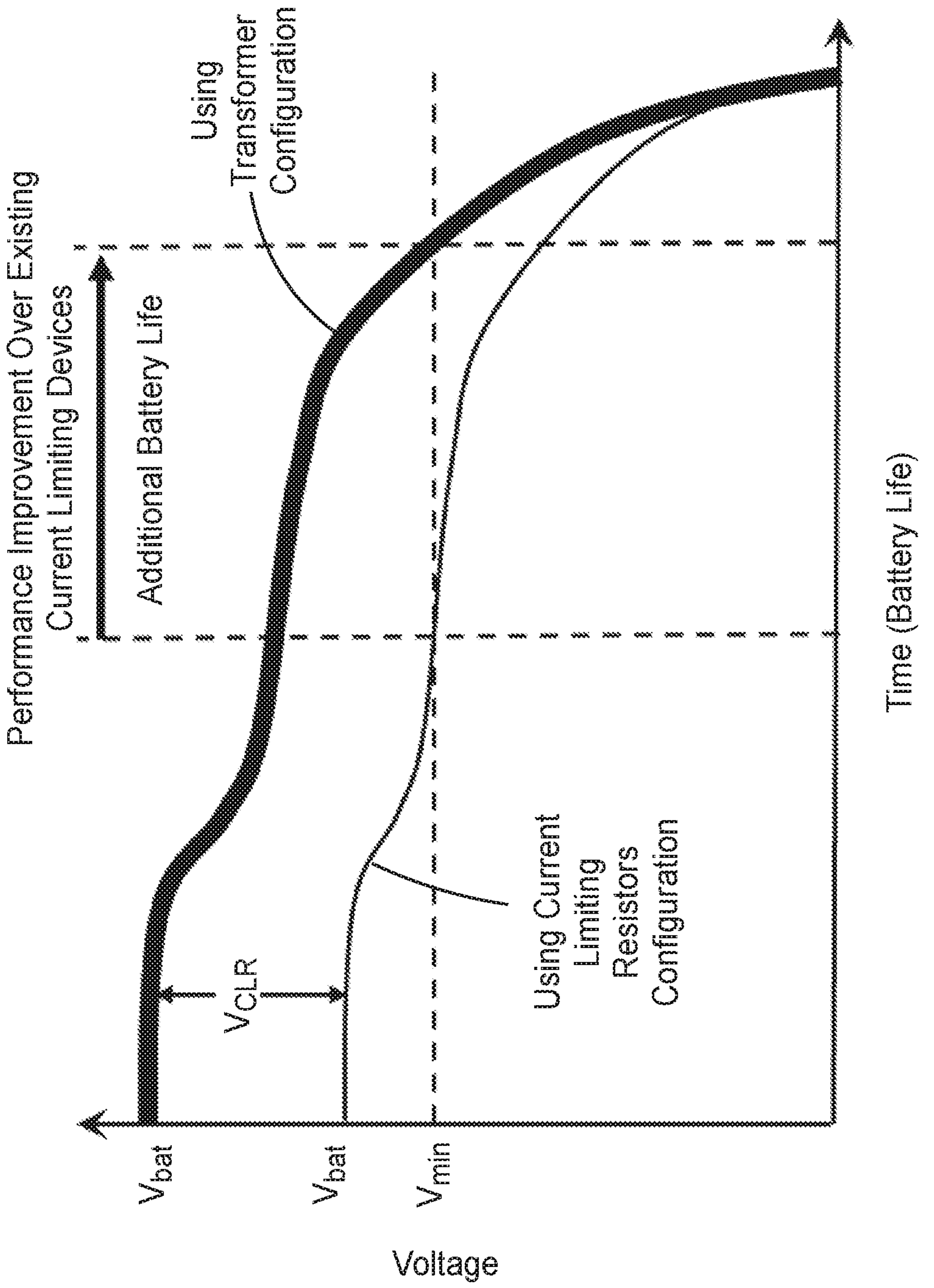
FIG. 9 is a diagram illustrating voltage versus time comparing current limiting resistors configuration with the transformer configuration of the instant invention.

FIG. 9 is a diagram illustrating voltage vs time in terms of battery life of energy source 32. In particular, battery voltage (Vbat) of energy source 32 is illustrated for the transformer 40 configuration described herein and for an existing CLR configuration. As illustrated in FIG. 9, the transformer 40 configuration described herein provides additional battery life over the CLR configuration where Vmin corresponds to a minimum voltage required for one or more components of MCU 20 to operate as configured. In other words, the current limiting device 24 including transformer 40 for providing a current limiting energy source is able to provide voltage at or about Vmin for a longer period of time than using CLRs, thereby extending battery life of energy source 32.

Therefore, in one or more embodiments, the current limiting device 24 including the specifically configured transformer 40 provides an Intrinsically Safe (IS) current limit power source that is part of a Self-Contained Breathing Apparatus (SCBA) mask 12. For example, the current limiting device 24 that includes the specifically configured transformer 40 provides energy to at least one port 36 (e.g., serial port, USB, etc.) of the SCBA mask 12. In one or more embodiments, the current limiting device 24 forms a galvanic barrier between one or more components of the SCBA mask 12 while also providing an IS current limiting energy source.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A mask configured for fluid communication with a fluid reservoir, the mask comprising:

a fluid regulator in fluid communication with the fluid reservoir, the fluid regulator configured to regulate fluid flow;

an energy source; and a current limiting device including a transformer, the transformer including:

a primary winding configured to accept an input current;

a core electromagnetically coupled to the primary winding; and a secondary winding electromagnetically coupled to the core, the secondary winding configured to provide a current limiting energy source based on the input current, the current limiting energy source being limited to a predetermined maximum current based on at least one characteristic of the core.

2. The mask of claim 1, wherein the at least one characteristic of the core is at least one core saturation characteristic.

3. The mask of claim 2, wherein the at least one core saturation characteristic of the core includes at least one dimension and at least one material of the core.

4. The mask of claim 1, wherein the current limiting energy source is configured to provide energy to at least two peripheral devices having different power consumption requirements.

5. The mask of claim 1, wherein the current limiting energy source is configured to provide galvanic isolation and power for a serial port for powering at least one serial port peripheral device.

6. The mask of claim 1, wherein the transformer is a push-pull transformer.

7. The mask of claim 1, wherein the current limiting device is a resistor-less current limit device.

8. The mask of claim 1, wherein the current limiting device further includes at least one safety circuit in electrical communication with the secondary winding, the at least one safety circuit including at least one Zener diode that is configured to shut to ground based at least in part on a voltage at the secondary winding.

* * * * *